US011689091B2

United States Patent
Lee (10) Patent No.: US 11,689,091 B2
(45) Date of Patent: Jun. 27, 2023

(54) EDDY CURRENT TYPE RESISTANCE DEVICE

(71) Applicant: CHI HUA FITNESS CO., LTD., Hsinchu County (TW)

(72) Inventor: Chia Jung Lee, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 0 days.

(21) Appl. No.: 17/500,254

(22) Filed: Oct. 13, 2021

(65) Prior Publication Data

US 2023/0113237 A1  Apr. 13, 2023

(51) Int. Cl.
*H02K 49/04* (2006.01)
*A63B 21/005* (2006.01)
*A63B 21/22* (2006.01)
*H02K 7/02* (2006.01)
*H02K 11/22* (2016.01)

(52) U.S. Cl.
CPC ....... *H02K 49/043* (2013.01); *A63B 21/0051* (2013.01); *A63B 21/225* (2013.01); *H02K 7/02* (2013.01); *H02K 11/22* (2016.01)

(58) Field of Classification Search
CPC ........ H02K 49/043; H02K 11/22; H02K 7/02; A63B 21/0051; A63B 21/225
See application file for complete search history.

(56) References Cited

U.S. PATENT DOCUMENTS 6,661,136 B1 * 12/2003 Lee .............. H02K 5/00
310/74

FOREIGN PATENT DOCUMENTS

CN 203798814 U * 8/2014
CN 210302173 U * 4/2020

OTHER PUBLICATIONS

CN-210302173-U_English Translation.*
CN-203798814-U_English Translation.*

* cited by examiner

*Primary Examiner* — Ahmed Elnakib
*Assistant Examiner* — Mohammed Ahmed Qureshi
(74) *Attorney, Agent, or Firm* — Rosenberg, Klein & Lee (57) ABSTRACT

An eddy current type resistance device comprising: a ring-shaped flywheel; a shaft center, the shaft center has an axial blind hole, the shaft center has a radial blind hole, the radial blind hole is connected to the axial blind hole; a positioning frame, connected to the shaft center inside the ring-shaped flywheel; multiple magnetic field generating components, evenly arranged on the positioning frame, and make the signal wires of the magnetic field generating components pass through the radial blind hole and the axial blind hole the outer end of the shaft center; and a side cover, connecting to the other side of the ring-shaped flywheel, and is connected to the shaft center by a bearing. Thereby having the effect of simplifying the type and process of the side cover.

2 Claims, 8 Drawing Sheets

EDDY CURRENT TYPE RESISTANCE DEVICE

BACKGROUND OF THE INVENTION

1. Field of the Invention

The invention relates to an eddy current type resistance device, especially to one that has a guide hole formed with a signal wire on the shaft center to guide the signal wire to the outer end of the shaft center in advance, thereby simplifying the shape and process of the side cover.

2. Description of the Related Art

Figure 1:
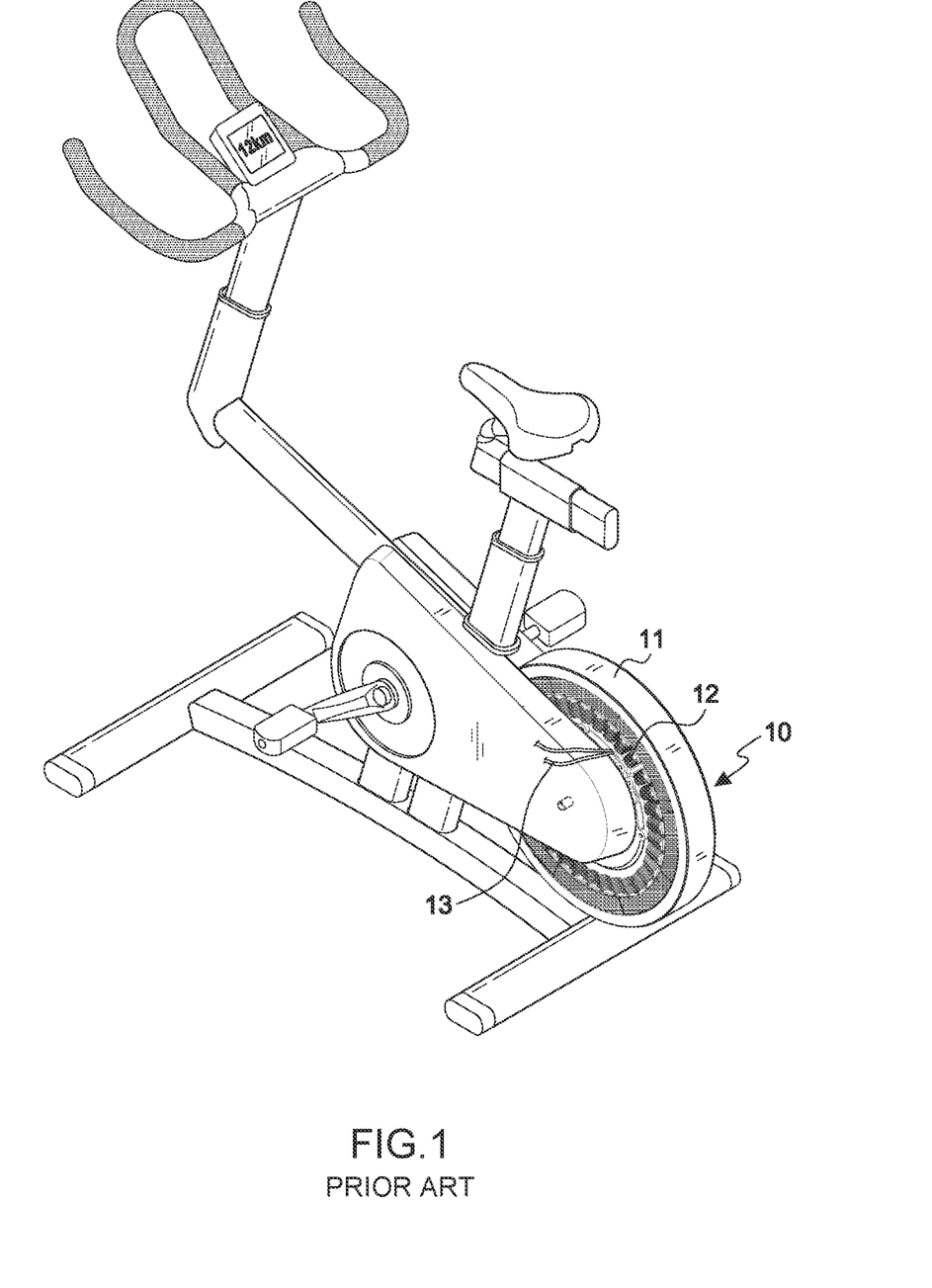
FIG. 1 is a schematic diagram of the prior art that the lateral side must have a side cover according to the fitness equipment.
Figure 2:
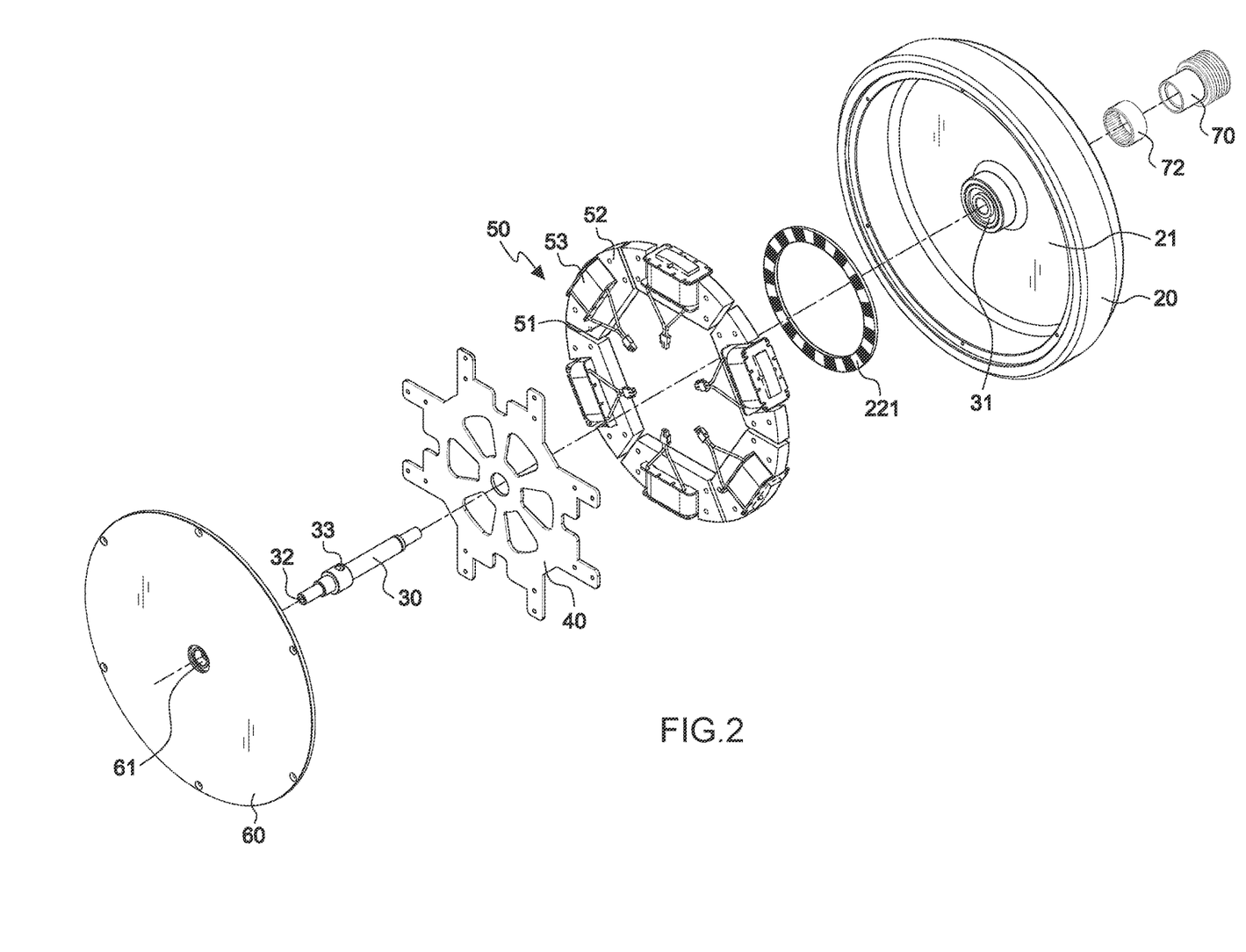
FIG. 2 is an exploded perspective view of the present invention.
Figure 3A:
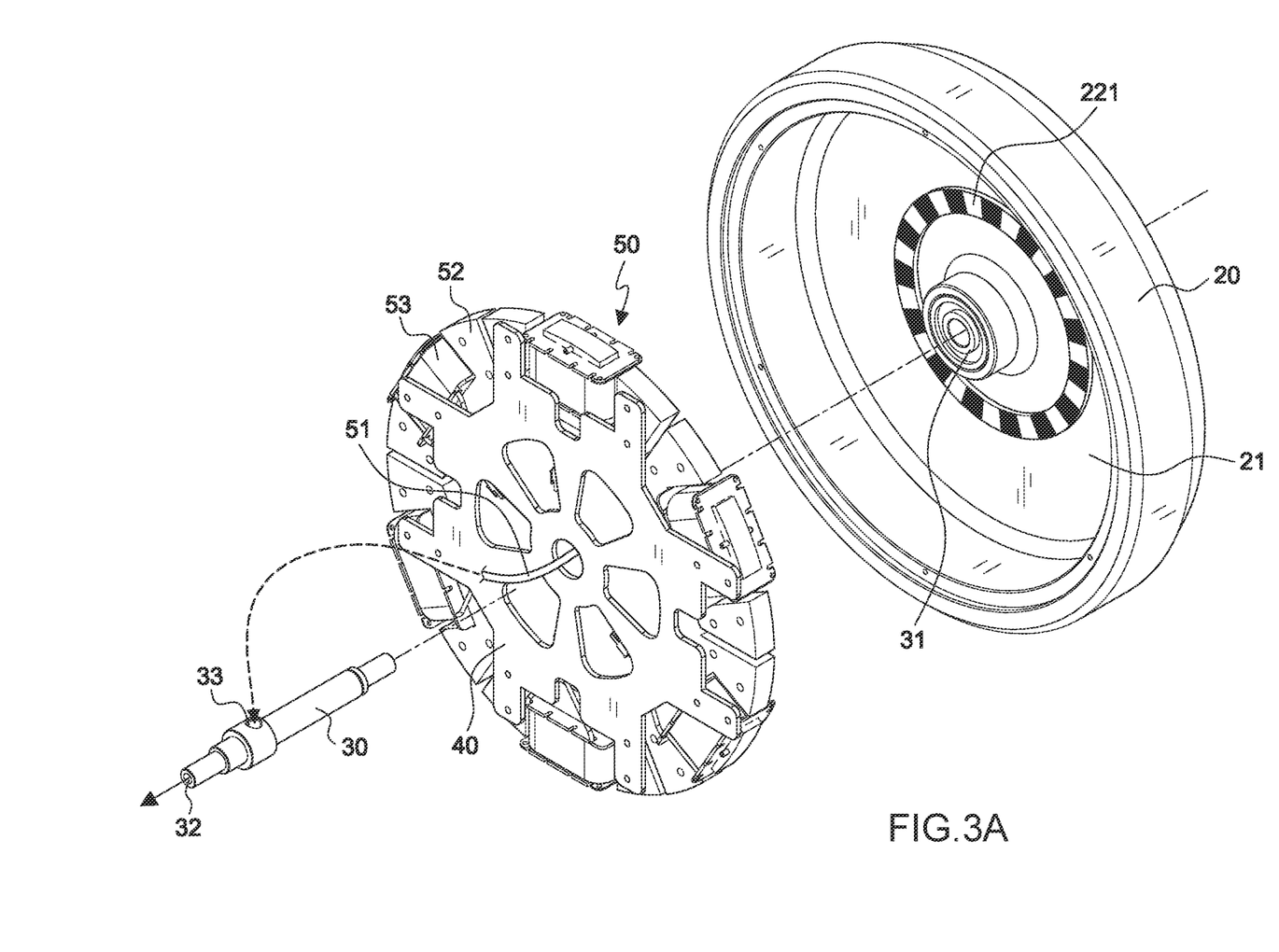
FIG. 3A is an exploded perspective view of a part of the present invention.
Figure 3B:
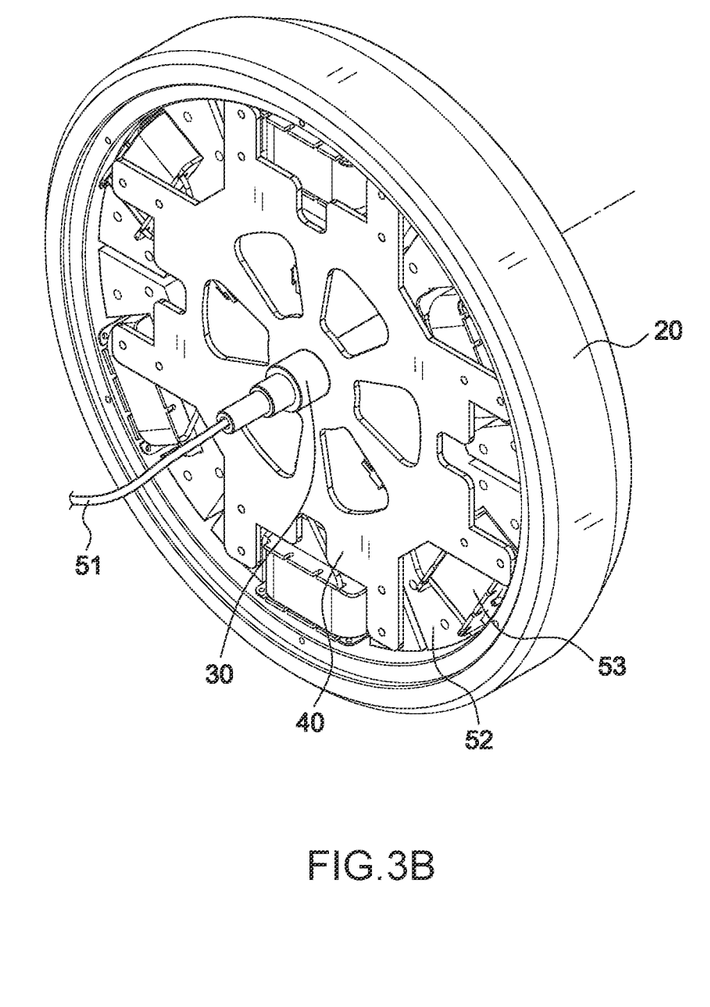
FIG. 3B is an assembly perspective view of a part of the present invention.
Figure 4:
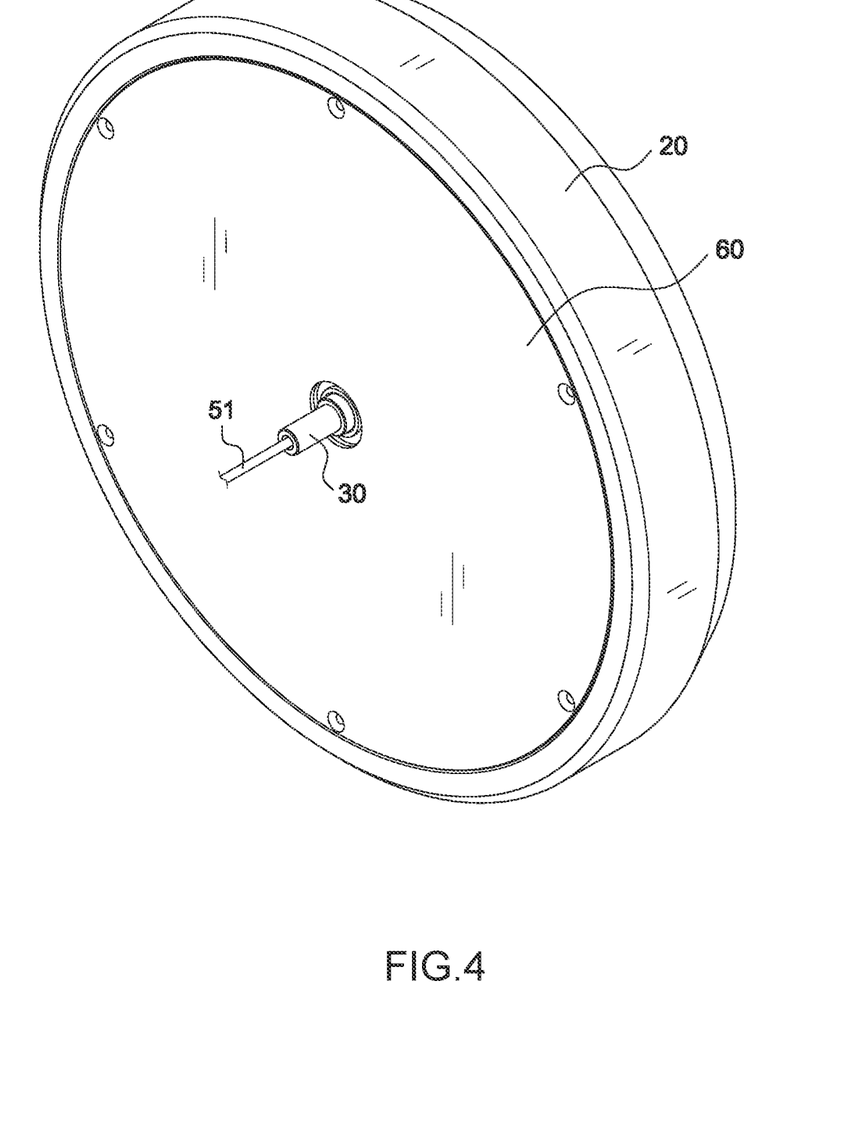
FIG. 4 is a perspective view illustrating the structure of the present invention.
Figure 5:
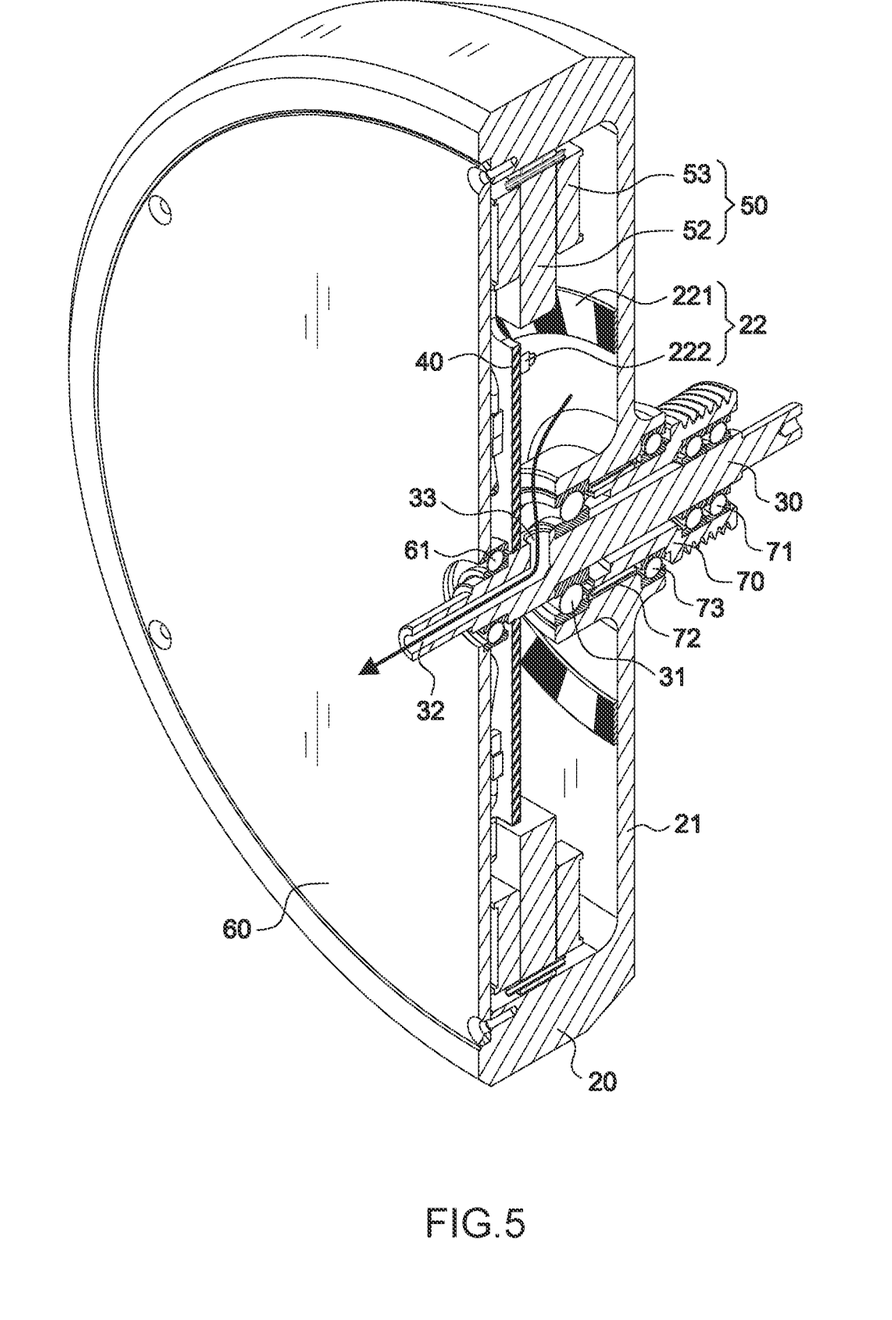
FIG. 5 is a three-dimensional sectional view the structure of the present invention.
Figure 6:
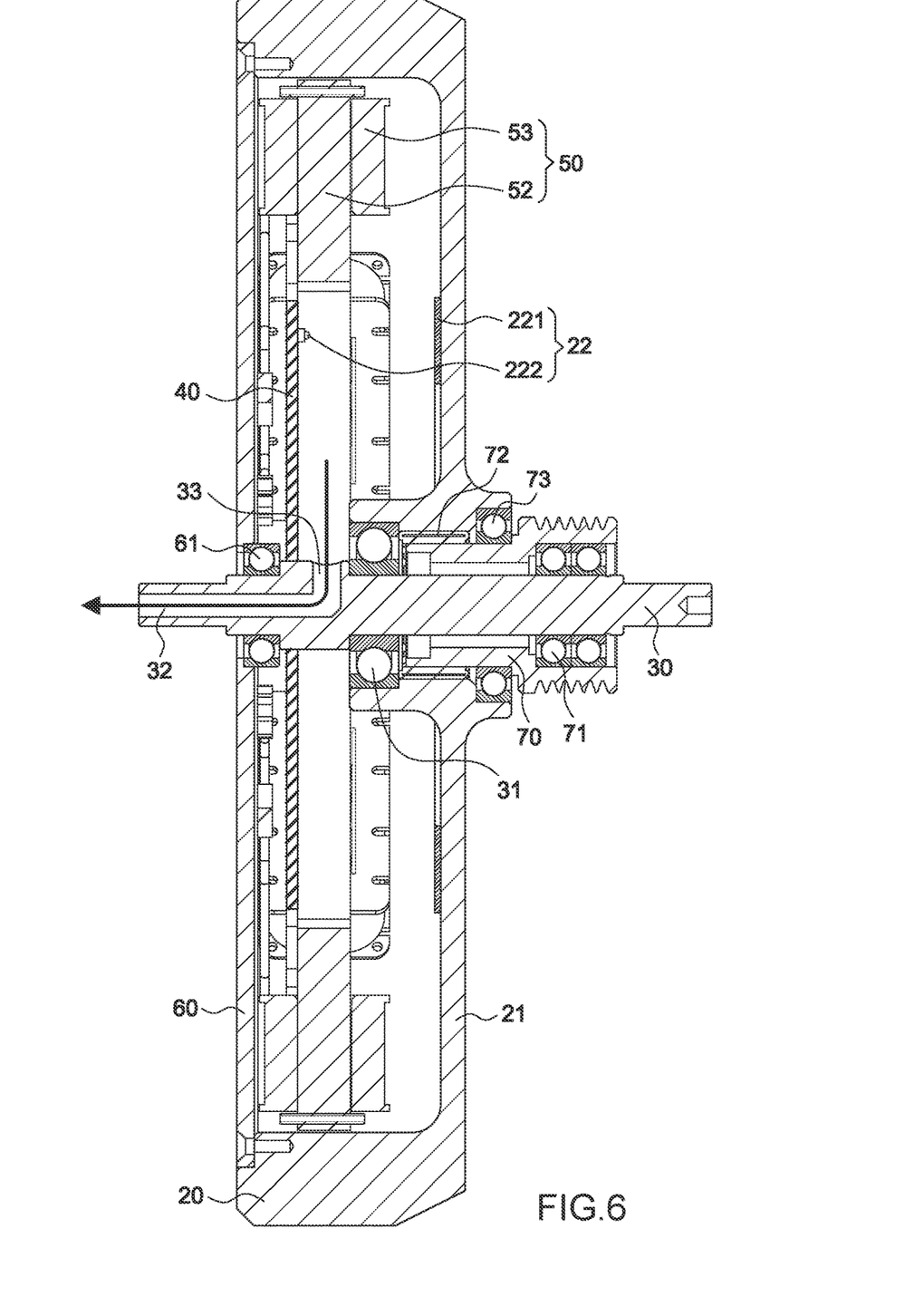
FIG. 6 is a two-dimensional sectional view the structure of the present invention.

Referring to FIG. 1, many fitness exercise equipment will be equipped with a resistance device 10 to adjust the load resistance of the exercise; however, the general resistance device 10 is usually provided with a magnetic resistance member 12 inside a ring-shaped flywheel 11, and the ring-shaped flywheel 11 provides rotational inertial force, the magnetic resistance member 12 adjusts the load resistance, and the magnetic resistance member 12 also has a signal wire 13 that must be connected to the outside. However, the resistance device 10 will be installed on many different types/sizes of fitness equipment. For cooperating with the wiring arrangement of the signal wire 13 in fitness equipment of different types/sizes, the side of the resistance device 10 will be exposed first After the resistance device 10 is installed in the fitness equipment and the signal wire 13 is arranged, the side of the resistance device 10 must be covered with the type/size that relative to the fitness exercise equipment. As a result, the side of the conventional resistance device must be covered relative to the fitness exercise equipment, and the type and process of the side cover will be more complex.

SUMMARY OF THE INVENTION

It is a primary objective of the present invention to solve the problem that the type and process of the side cover of the prior art will be more complex, so as to has the effect of simplifying the type and process of the side cover.

In order to achieve the above objectives, the present invention including: an eddy current type resistance device comprising: a ring-shaped flywheel, having a side surface part; a shaft center, combing to the side surface part of the ring-shaped flywheel by the bearing, the shaft center has an axial blind hole at the end that away from the side surface part, the shaft center has a radial blind hole inside the ring-shaped flywheel, the radial blind hole is connected to the axial blind hole; a positioning frame, connecting to the shaft center inside ring-shaped flywheel; multiple magnetic field generating components, evenly arranged on the positioning frame to be close to the inner periphery of the ring-shaped flywheel, and make the signal wires of the magnetic field generating components pass through the radial blind hole and the axial blind hole of the shaft center to the outer end of the shaft center; and a side cover, relative to the side surface part, connecting to the other side of the ring-shaped flywheel, and is connected to the shaft center by a bearing.

Moreover, the magnetic field generating components are formed by pole cores and coils, inside the ring-shaped flywheel further has a rotation speed sensing unit, wherein the rotation speed sensing unit is formed by the rotation speed sticker arranged at the side surface part and the light sensor arranged at the positioning frame.

DETAILED DESCRIPTION OF THE PREFERRED EMBODIMENT

Referring to FIGS. 2-6, the present invention including: a ring-shaped flywheel 20, having a side surface part 21, inside the ring-shaped flywheel 20 further has a rotation speed sensing unit 22; a shaft center 30, combined with the side surface part 21 of the ring-shaped flywheel 20 by the bearing 31, the shaft center 30 has an axial blind hole 32 at the end that away from the side surface part 21, the shaft center 30 has a radial blind hole 33 inside the ring-shaped flywheel 20, the radial blind hole 33 is connected to the axial blind hole 32; a positioning frame 40, connected to the shaft center 30 inside the ring-shaped flywheel 20, wherein the rotation speed sensing unit 22 is formed by the rotation speed sticker 221 arranged at the side surface part 21 and the light sensor 222 arranged at the positioning frame 40; multiple magnetic field generating components 50, evenly arranged on the positioning frame 40 to be close to the inner periphery of the ring-shaped flywheel 20, and make the signal wires 51 of the magnetic field generating components 50 pass through the radial blind hole 33 and the axial blind hole 32 of the shaft center 30 to the outer end of the shaft center 30, the magnetic field generating components 50 are formed by a pole core 52 and a coil 53; and a side cover 60, relative to the side surface part 21, connecting to the other side of the ring-shaped flywheel 20, and is connected to the shaft center 30 by a bearing 61.

Figure 7:
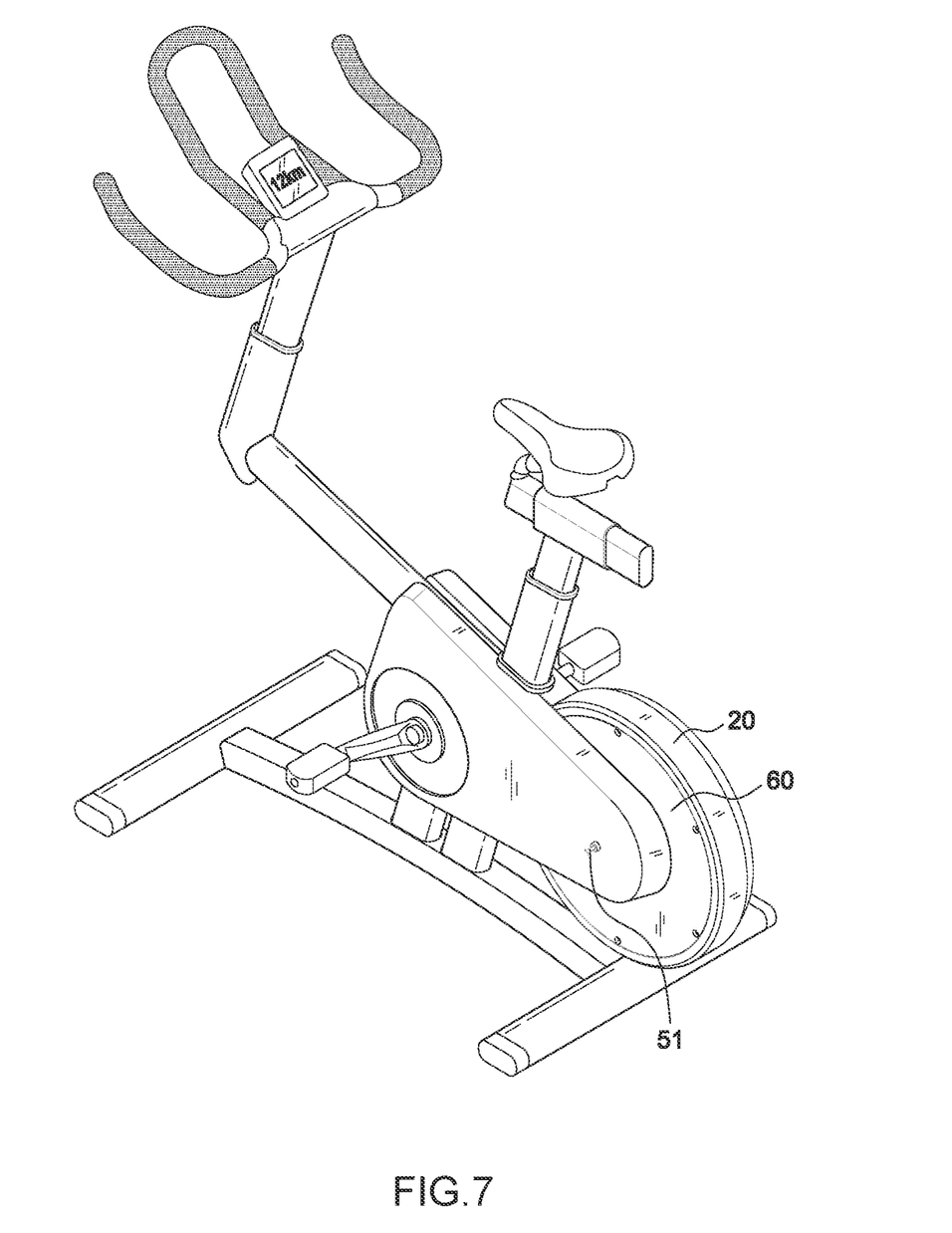
FIG. 7 is a schematic diagram illustrating the present invention that can previously have a side cover before installing on the fitness equipment.

With the feature disclosed above, the present invention uses the magnetic field created by the magnetic field generating components 50 to make the ring-shaped flywheel 20 induct to create an eddy current, so as to provide an adjustable load resistance, the signal wires 51 of the magnetic field generating components 50 can pass through the radial blind hole 33 and the axial blind hole 32 of the shaft center 30 from the inside of the ring-shaped flywheel 20 to the outer end of the shaft center 30; and the shaft center 30 can combine to the driving wheel 70 of fitness equipment through the bearing 71, and between the driving wheel 70 and the ring-shaped flywheel 20 has a one-way bearing 72 and bearing 73 as FIG. 7 showing that the present invention installing on the fitness equipment.

Therefore, the present invention make the shaft center form a guide hole (radial blind hole and the axial blind hole with a signal wire, In the process of assembling the resistance device, the signal line is guided from the inside of the ring-shaped flywheel to the outer end of the shaft center, and the other side of the ring-shaped flywheel is covered by the side cover in advance, with the above features, different types/sizes of fitness equipment can be installed directly, which solves the problem that the side of the conventional resistance device must be relative to the fitness exercise equipment and has the effect of simplifying the type and process of the side cover.

Although particular embodiments of the invention have been described in detail for purposes of illustration, various modifications and enhancements may be made without departing from the spirit and scope of the invention. Accordingly, the invention is not limited except as by the appended claims.

What is claimed is:

1. An eddy current type resistance device comprising:
    a ring-shaped flywheel, having an interior space and a side surface part on a first side of the ring-shaped flywheel and forming a closure for one side of the interior space;
    a shaft, coupled to the side surface part of the ring-shaped flywheel by a first bearing, the shaft has an axial blind hole at an end thereof that is away from the side surface part, the shaft has a radial blind hole inside the interior space of the ring-shaped flywheel that is in open communication with the axial blind hole, wherein the shaft is coupled to a driving wheel through a second bearing, and between the driving wheel and the ring-shaped flywheel there is disposed a one-way bearing and a third bearing;
    a positioning frame, connected to the shaft and disposed inside the interior space of the ring-shaped flywheel;
    a speed sensing unit disposed within the interior space of the ring-shaped flywheel, the sensing unit including a rotation speed sticker mounted on an interior side of the side surface part and a light sensor mounted on the positioning frame;
    multiple magnetic field generating components, evenly arranged on the positioning frame to be close to an inner periphery of the ring-shaped flywheel, and the magnetic field generating components have signal wires that pass through the radial blind hole and the axial blind hole of the shaft to exit an outer end of the shaft; and
    a side cover, coupled to a second opposing side of the ring-shaped flywheel and forming a closure of a corresponding side of the interior space, the side cover being coupled to the shaft by a fourth bearing.

2. The eddy current type resistance device as claimed in claim 1, wherein the magnetic field generating components are formed by pole cores and coils.

* * * * *